(12) United States Patent
Tarbutton et al.

(10) Patent No.: US 11,445,707 B2
(45) Date of Patent: Sep. 20, 2022

(54) LEAD TRAINING DEVICES AND METHODS

(71) Applicant: Bravo Marketplace LLC, Charlotte, NC (US)

(72) Inventors: Joshua Tarbutton, Charlotte, NC (US); Cody Orlovsky, Charlotte, NC (US); Jordan Burch, Huntersville, NC (US)

(73) Assignee: BRAVO MARKETPLACE LLC

( * ) Notice: Subject to any disclaimer, the term of this patent is extended or adjusted under 35 U.S.C. 154(b) by 140 days.

(21) Appl. No.: 17/088,448

(22) Filed: Nov. 3, 2020

(65) Prior Publication Data

US 2021/0127640 A1    May 6, 2021

Related U.S. Application Data

(60) Provisional application No. 62/930,380, filed on Nov. 4, 2019.

(51) Int. Cl.
*A01K 27/00* (2006.01)

(52) U.S. Cl.
CPC .................. *A01K 27/009* (2013.01)

(58) Field of Classification Search
CPC .. A01K 27/009; A01K 15/023; A01K 15/022; A01K 15/021; A01K 15/029
See application file for complete search history.

(56) References Cited

U.S. PATENT DOCUMENTS

| | | | |
|---|---|---|---|
| 5,494,002 A * | 2/1996 | Greene | A01K 15/021 |
| | | | 119/908 |
| 5,911,199 A | 6/1999 | Farkas et al. | |
| 6,003,474 A | 12/1999 | Slater et al. | |
| 6,116,192 A | 9/2000 | Hultine et al. | |
| 8,402,924 B2 | 3/2013 | Pacheco et al. | |
| 8,763,563 B2 | 7/2014 | Thalmann | |
| 9,295,230 B1 | 3/2016 | Beck | |
| 9,462,789 B2 | 10/2016 | Beck | |
| 10,602,722 B1 * | 3/2020 | Hetzer | A01K 27/003 |
| 10,820,576 B1 * | 11/2020 | Colburn | A01K 27/005 |
| 2008/0314336 A1 | 12/2008 | Church et al. | |
| 2010/0050955 A1 * | 3/2010 | Pacheco | A01K 15/021 |
| | | | 119/719 |

(Continued)

FOREIGN PATENT DOCUMENTS

| | | |
|---|---|---|
| CN | 201995443 U | 10/2011 |
| DE | 20000825 U1 | 5/2000 |

(Continued)

*Primary Examiner* — Magdalena Topolski
*Assistant Examiner* — Katherine Anne Kloecker
(74) *Attorney, Agent, or Firm* — Marshall, Gerstein & Borun LLP

(57) ABSTRACT

Training devices and methods are disclosed herein for training animals on a lead against excessive pulling by delivery escalating stimuli to the animal. The training devices described herein are coupled to a collar and include a housing with portions that can be moved toward one another against a force provided by a biasing device, such that when the collar is pulled against the neck of the animal, the compression of the training device between the collar and the neck of the animal causes the housing portions to move together. This configuration can be utilized to determine an amount of force imparted to a lead by an animal and/or to expose electrodes of a shock assembly.

20 Claims, 6 Drawing Sheets

(56) References Cited

U.S. PATENT DOCUMENTS

| | | | |
|---|---|---|---|
| 2011/0203529 A1* | 8/2011 | Mainini | A01K 15/02 |
| | | | 119/859 |
| 2012/0017844 A1 | 1/2012 | Nelson | |
| 2013/0233252 A1* | 9/2013 | Bellon | A01K 27/009 |
| | | | 119/720 |
| 2015/0359197 A1 | 12/2015 | Crucs | |
| 2016/0242393 A1 | 8/2016 | Kennedy et al. | |

FOREIGN PATENT DOCUMENTS

| | | |
|---|---|---|
| JP | H11169009 A | 6/1999 |
| JP | 2018019611 A | 2/2018 |

* cited by examiner

LEAD TRAINING DEVICES AND METHODS

CROSS-REFERENCE TO RELATED APPLICATION

This application claims the priority benefit of U.S. Provisional Application No. 62/930,380, filed Nov. 4, 2019, which is incorporated by reference herein in its entirety.

FIELD OF THE DISCLOSURE

The present disclosure generally relates to animal training device and, more particularly, to animal training devices intended to train animals to not pull excessively on a lead.

BACKGROUND

Leads are used to restrain and control the movement of various kinds of animals. Untrained animals often pull against a lead, which can result in harm to the animal, as well as, harm and/or irritate a handler. Accordingly, many devices have been developed to help a handler train an animal to not pull excessively on a lead. These devices include spiked collars, choker collars, and collars that include various stimulus devices. Additional devices are needed, however, that provide increased functionality and/or compact design.

SUMMARY

In accordance with a first aspect, a training device mountable to a collar for training an animal on a lead coupled to the collar is disclosed herein. In this form, the training device includes a housing having first and second portions that are movable toward one another from an expanded state. The housing is configured to be coupled to the collar so that the housing is disposed inwardly of at least a portion of the collar such that tension on the lead causes the first and second portions to move toward one another. The training device of this form further includes a biasing device configured to act on the first and second portions to bias the housing to the expanded state and an electronic assembly at least partially disposed within the housing. The electronic assembly includes a controller, a power source, first and second stimulus generating devices, and a lead tension measurement assembly that includes a Hall effect sensor coupled to one of the first and second portions and a magnet coupled to the other of the first and second portions. With this configuration, the controller is configured to: monitor a magnetic field strength measured by the Hall effect sensor to determine an amount of movement of the first and second portions of the housing relative to one another, activate the first stimulus generating device to generate a first stimulus in response to determining that the magnetic field strength exceeds a predetermined threshold, and activate the second stimulus generating device to generate a second stimulus in response to determining that the magnetic field strength is maintained above the predetermined threshold for a predetermined amount of time or the magnetic field strength exceeds a second predetermined threshold, the second predetermined threshold being higher than the first predetermined threshold.

According to some forms, the training device can include one or more of the following aspects: the first stimulus generating device can be a tone generator or a vibration device and the second stimulus generating device can be a shock assembly including a pair of electrodes having distal ends that extend out of the housing to contact skin of the animal wearing the collar; the electronic assembly can include a third stimulus generating device and the controller can be configured to activate the third stimulus generating device in response to determining that the magnetic field strength is maintained above the second predetermined threshold for a predetermined amount of time or the magnetic field strength exceeds a third predetermined threshold, the third predetermined threshold being higher than the second predetermined threshold, which in a further form the first stimulus generating device can be a tone generator, the second stimulus generating device can be a vibration device, and the third stimulus generating device can be a shock assembly including a pair of electrodes having distal ends that extend out of the housing to contact skin of the animal wearing the collar; the first and second portions of the housing can be a base and cover telescopically coupled together; or an interior surface of the housing can have a concave configuration to be complementary to a neck of the animal.

In accordance with a second aspect, a training device mountable to a collar for training an animal on a lead coupled to the collar is disclosed that includes a housing having first and second portions movable toward one another from an expanded state. The housing is configured to be coupled to the collar so that the housing is disposed inwardly of at least a portion of the collar with an interior wall of the housing facing the animal such that tension on the lead causes the first and second portions to move toward one another. The training device further includes a biasing device that is configured to act on the first and second portions to bias the housing to the expanded state and an electronic assembly that is at least partially disposed within the housing. The electronic assembly includes a tension sensor that is configured to measure data corresponding to a tension imparted to the collar by the lead, a power source, a first stimulus generating device, and a second stimulus generating device that is a shock assembly including a pair of electrodes each having a distal tip, where the distal tips are concealed within the housing with the housing in the expanded state and exposed as the first and second portions of the housing are moved towards one another, and a controller that is operably coupled to the tension sensor. With this configuration, the controller is configured to: activate the first stimulus generating device to generate a first stimulus in response to determining that the data exceeds a predetermined threshold and activate the second stimulus generating device to generate a shock in response to determining that the data is maintained above the predetermined threshold for a predetermined amount of time or the data exceeds a second predetermined threshold, the second predetermined threshold being higher than the first predetermined threshold.

According to some forms, the training device can include one or more of the following aspects: the interior wall of the housing can define a pair of recesses therein, where the distal ends of the electrodes are concealed within the recesses with the housing in the expanded state; the electrodes can each have an elongate body with a proximal end mounted within the housing and a bulbous distal end, where the bulbous distal end includes an outwardly tapering surface; the first stimulus generating device can be a tone generator or a vibration device; the tension sensor can be a Hall effect sensor coupled to one of the first and second portions and a magnet coupled to the other of the first and second portions and the controller can be configured to monitor a magnetic field strength measured by the Hall effect sensor to determine an amount of movement of the first and second portions of the housing relative to one another; the first and second portions of the housing can be a base and cover telescopically coupled together; or the interior wall of the housing can have a concave configuration to be complementary to a neck of the animal.

According to some forms, the electronic assembly can include a third stimulus generating device; and the electronic assembly can be configured to: activate the third stimulus generating device to generate a third stimulus in response to determining that the data is maintained above the predetermined threshold for a predetermined amount of time or the data exceeds a third predetermined threshold, where the third predetermined threshold is intermediate of the first predetermined threshold and the second predetermined threshold; and activate the second stimulus generating device to generate the shock in response to determining that the data is maintained above the third predetermined threshold for a predetermined amount of time or the data exceeds the second predetermined threshold, the second predetermined threshold being higher than the first and third predetermined thresholds.

In accordance with additional aspects, methods of training an animal using the above training devices are described. In one example form, a method for training an animal on a lead with a training device mounted to a collar is described that includes biasing first and second portions of a housing to an expanded state, where the first and second portions being movable toward one another from the expanded state, monitoring a magnetic field strength of a magnet coupled to one of the first and second portions of the housing measured by a Hall effect sensor coupled to the other of the first and second portions of the housing with a controller to determine an amount of movement of the first and second portions of the housing relative to one another, activating a first stimulus generating device with the controller to generate a first stimulus in response to determining that the magnetic field strength exceeds a predetermined threshold, and activating a second stimulus generating device with the controller to generate a second stimulus in response to determining that the magnetic field strength is maintained above the predetermined threshold for a predetermined amount of time or the magnetic field strength exceeds a second predetermined threshold, the second predetermined threshold being higher than the first predetermined threshold.

According to some forms, activating the first stimulus generating device with the controller to generate the first stimulus can include activating a tone generator to generate a tone or activating a vibration device to vibrate the housing and activating the second stimulus generating device with the controller to generate the second stimulus can include activating a shock assembly including a pair of electrodes having distal ends that extend out of the housing to contact skin of the animal wearing the collar to generate a shock to the animal. In further forms, the method can include exposing the distal ends of the electrodes from concealment within the housing as the first and second portions of the housing are moved towards one another prior to activating the shock assembly. In yet further forms, exposing the distal ends of the electrodes form concealment within the housing can include exposing the distal ends of the electrodes from concealment within a pair of recesses defined by an interior wall of the housing.

According to some forms, the method can include activating a third stimulus generating device with the controller in response to determining that the magnetic field strength is maintained above the second predetermined threshold for a predetermined amount of time or the magnetic field strength exceeds a third predetermined threshold, the third predetermined threshold being higher than the second predetermined threshold. In further forms, activating the first stimulus generating device with the controller to generate the first stimulus can include activating a tone generator to generate a tone; activating the second stimulus generating device with the controller to generate a second stimulus can include activating a vibration device to vibrate the housing; and activating the third stimulus generating device with the controller to generate the third stimulus can include activating a shock assembly including a pair of electrodes having distal ends that extend out of the housing to contact skin of the animal wearing the collar to generate a shock to the animal.

DETAILED DESCRIPTION

Training devices and methods are disclosed herein for training animals on a lead against excessive pulling. The training devices and methods provide escalating stimuli in response to maintained and/or increased tension from a lead secured to a collar. The training devices can be coupled to the collar to be disposed between a portion of the collar and the animal. With this configuration, when the animal pulls on the lead, the collar is pulled against the neck of the animal, which compresses the training device. The training devices described herein include a housing with portions that can be moved toward one another against a force provided by a biasing device, such that when the collar is pulled against the neck of the animal, the compression of the training device between the collar and the neck of the animal causes the housing portions to move together. With this configuration, in some forms, the amount of movement of the housing portions can be used to correspond to a tension imparted to the lead by the animal. This advantageously allows the training device to have a compact configuration that can be provided on a collar or can be mounted to old collars. Additionally, in some forms, the movement of the housing portions can be utilized to conceal electrodes of the training device within the housing in an uncompressed state and exposed as the housing portions are moved toward one another. This minimizes contact between the neck of the animal and the electrodes to situations where the animal is pulling on the lead, advantageously reducing irritation to the neck due to the electrodes rubbing against the skin, as well as providing an additional stimulus to the animal.

Figure 1:
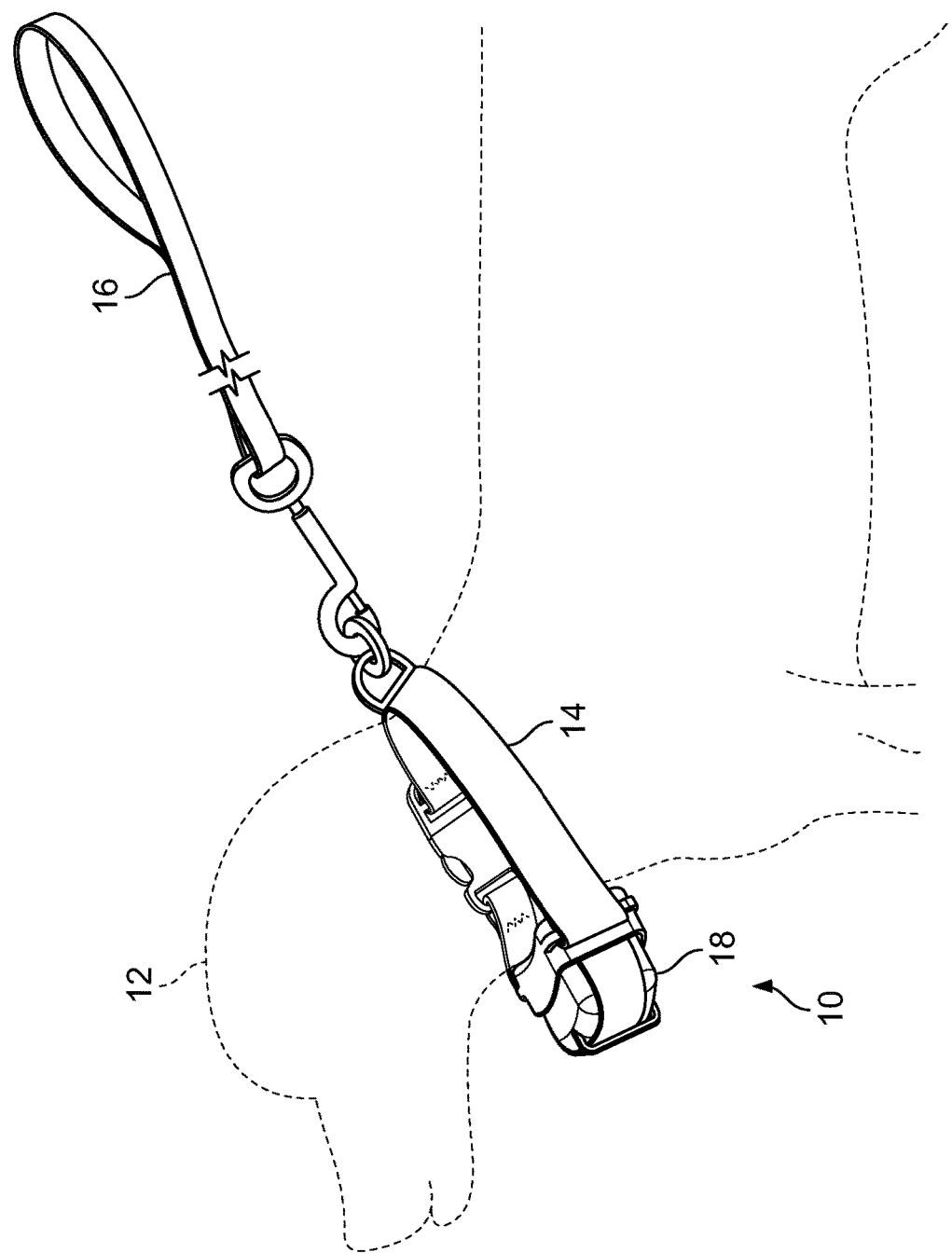
FIG. 1 is a perspective view of an animal wearing a collar with a lead attached to the collar and a training device coupled to the collar in accordance with various embodiments.

An example use and environment for training devices 10 as described herein are shown in FIG. 1. The training devices 10 are configured for training an animal 12 wearing a collar 14 having a lead 16 secured thereto against excessively pulling on the lead 16. The collar 14 can take any suitable form for harness and control of an animal, as described below. The training devices 10 include a housing 18 coupled to the collar 14, so as to be disposed between at least a portion of the collar 14 and the animal 12. The housing 18 is preferably coupled to the collar 14 at a forward location where the animal 12 imparts a pulling, tension force. For example, in some forms the housing 18 can be removably secured to the collar 14. In other forms the housing 18 can form a portion of the collar 14, such as by a portion of the housing 18 being formed together with the collar 14, or one or more portions of the housing 18 permanently secured to the collar 14 by a suitable mechanism, including stitching, adhesive, ultrasonic welding, rivets or other fasteners, etc. In some versions, the training devices 10 can be provided as a standalone component configured to be secured to a suitable harness 14. In other versions, the training devices 10 can include one or both of the harness 14 and lead 16.

Details of the housing 18, as well as, other components of the training device 10 are shown in FIGS. 2-7. The housing 18 includes first and second portions 20, 22 that are movable with respect to one another and an electronic assembly 24 disposed at least partially within the housing 18. In the illustrated form, the first portion 20 is a base and the second portion 22 is a cover that fits over the base 20, such that the base 20 can telescopically move into out of the cover 22. Of course, the first and second portions 20, 22 can be spaced from one another and movable towards one another while maintaining a spaced relation or until they abut one another.

As discussed above, the housing 18 can couple to the collar 14 by any suitable mechanism. In the illustrated form, the base 20 includes an outwardly extending handle 26 and the cover 22 includes a pair of laterally extending handles 28. The handles 26, 28 are configured to receive the collar 14 therethrough, so that the collar 14 is secured to both the base 20 and the cover 22 and positions the housing 18 between a portion of the collar 14 and the animal 12. The handles 26, 28 can be integrally formed with the base 20 or cover 22, respectively, or can be secured thereto by any suitable mechanism.

As shown, the training device 10 further includes one or more biasing devices 30 disposed between the base 20 and cover 22 to bias the housing 18 to an expanded state. With this configuration, without external forces acting on the housing 18, the biasing devices 30 hold the housing 18 in the expanded state and, in some versions, the base 20 and cover 22 can be restricted from movement away from one another beyond the expanded state. When a sufficiently large compressive force acts on the housing 18, however, the force of the biasing devices 30 is overcome and the base 20 and cover 22 are moved toward one another. In the illustrated form, the training device 10 includes two compression springs, but a single spring or more than two springs could be utilized. Additionally, other suitable biasing devices, such as a member of resilient material or the like could be used.

Figure 2:
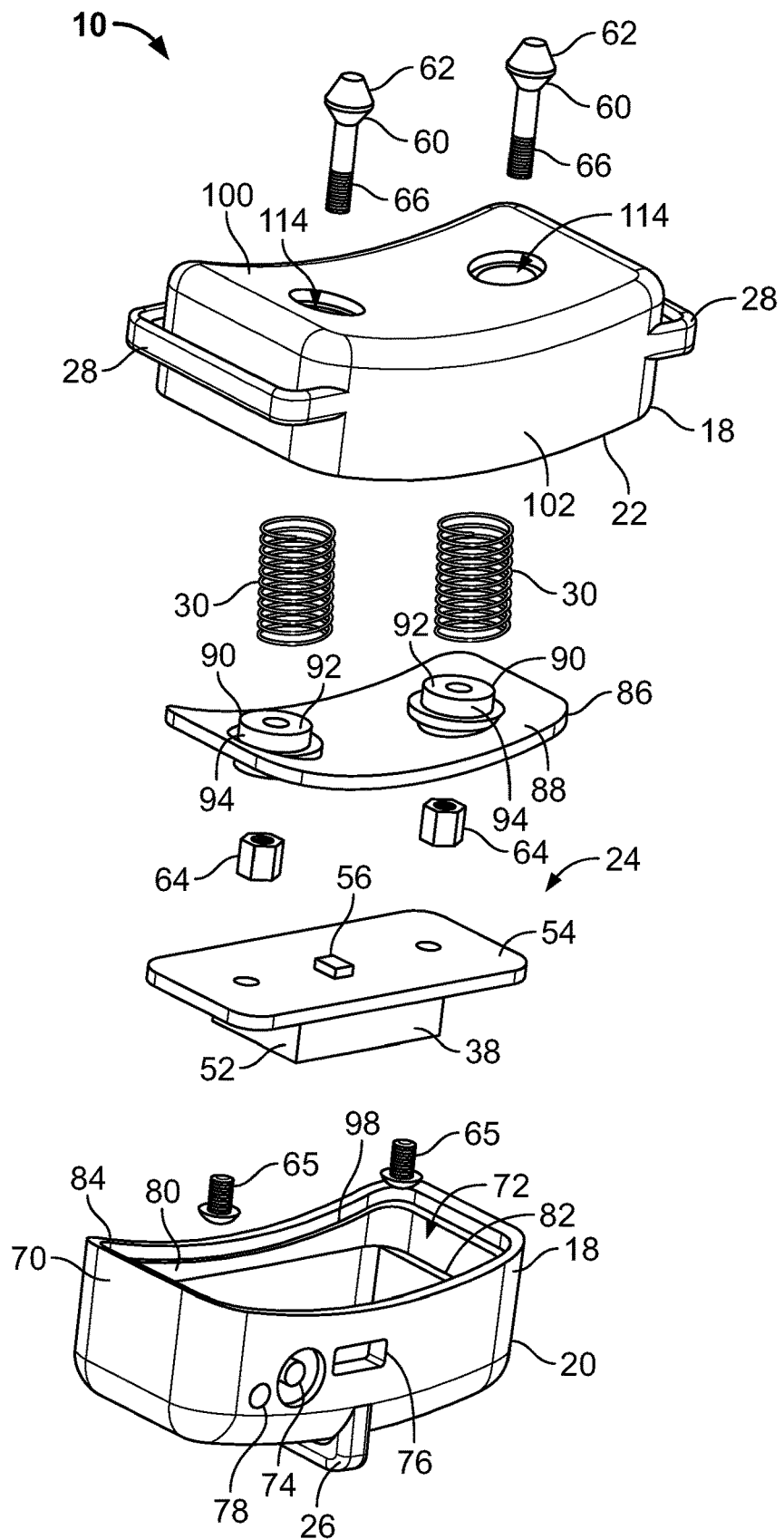
FIG. 2 is an exploded view of the training device of FIG. 1 including a housing and an electronic assembly.
Figure 3:
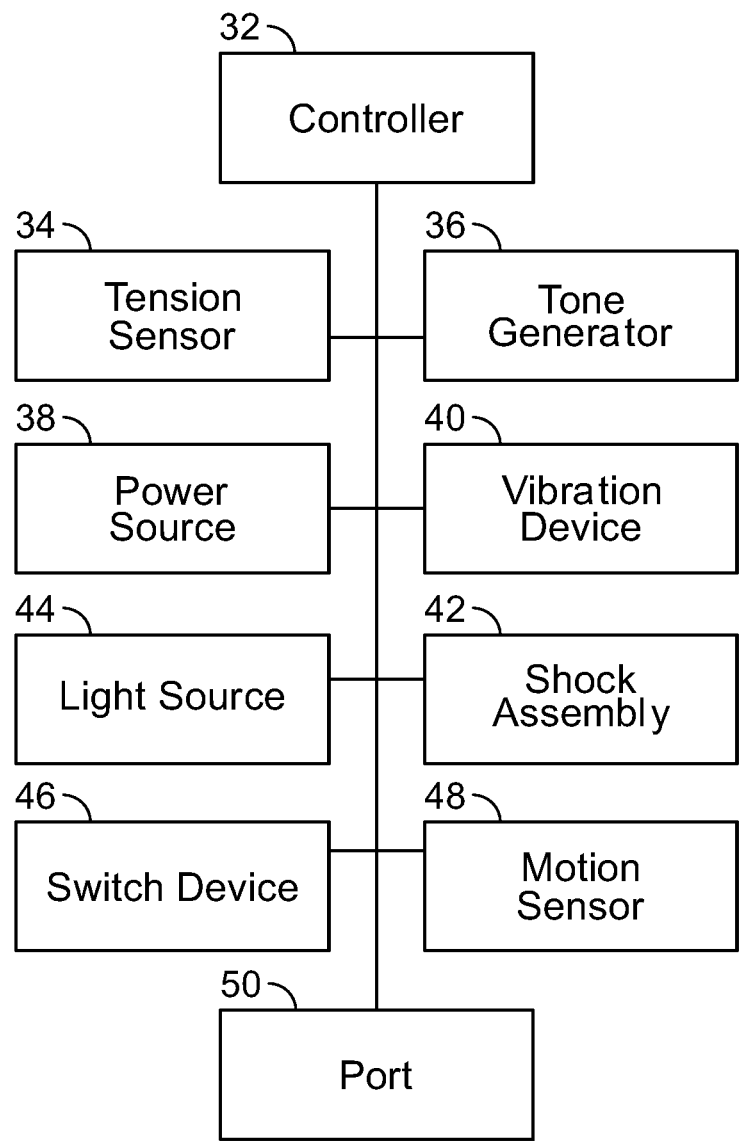
FIG. 3 is a diagrammatic view of example components of the electronic assembly of FIG. 2.
Figure 4:
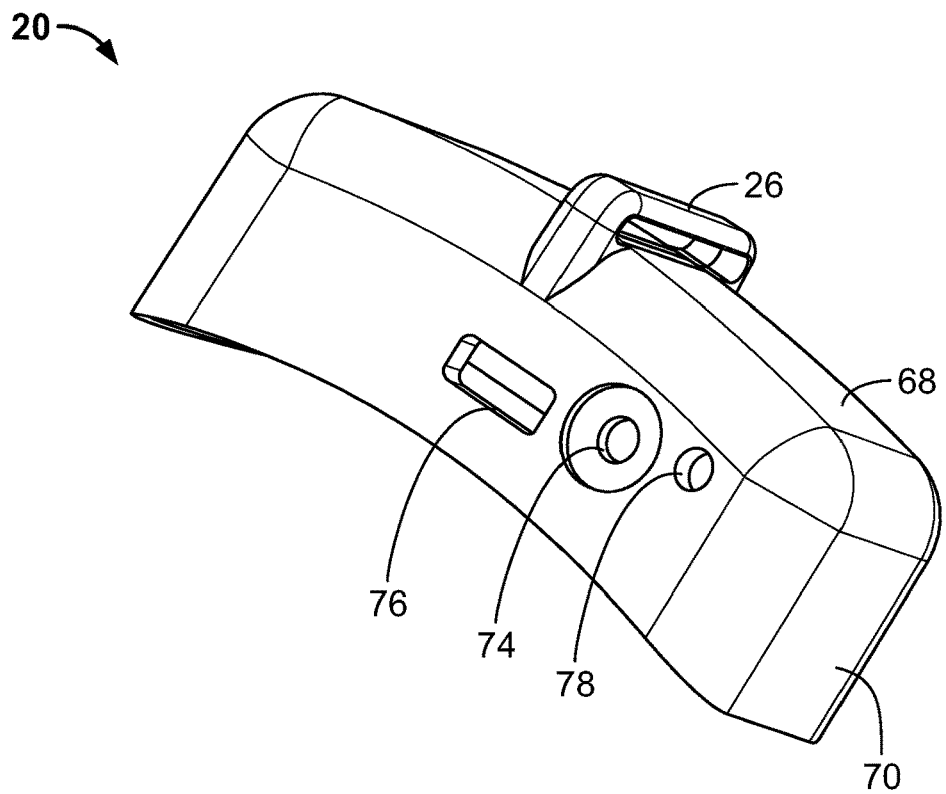
FIG. 4 is a perspective view of a base of the housing of FIG. 2.

As shown in FIGS. 2 and 3, the electronic assembly 24 can include a controller 32, a tension sensor or sensing assembly 34, a first stimulus generating device 36 configured to generate a first stimulus, and a power source 38 to provide power to the components of the electronic assembly 24. In some forms, the electronic assembly 24 can further include one or more of: a second stimulus generating device 40 configured to generate a second stimulus, a third stimulus generating device 42 configured to generate a third stimulus, a light source 44, an on/off switch device 46, which can be any suitable switch, such as a pushbutton or slide switch, a motion sensor 48, a port 50, and a transformer 52. The components of the electronic assembly 24 can be electrically coupled to or mounted to a circuit board 54. It will be understood that the components of the electronic assembly 24 are electrically coupled together by suitable structures, including traces, wires, circuits, contacts, and so forth.

In some versions, the light source 44 can be one or more light emitting diodes (LEDs), such as surface mount LEDs, that are visible external to the housing 18. The LEDs 44 can be utilized to provide an indication of a power source level to a user. For example, the controller 32 can energize a red LED 44 or can cause the LED 44 to project red light in response to the power source level being below a predetermined threshold, such as seventy five percent, fifty percent, or twenty five perfect. Similarly, the controller 32 can energize a green LED or can cause the LED 44 to project green light in response to the power source level being above the predetermined threshold. In alternative versions, the controller 44 can indicated power source level by pulsing the LED 44 a predetermined number of times.

In versions including the motion sensor 48, which can be a tilt switch, accelerometer, or the like, the controller 32 can be configured to enter a sleep mode to reduce power source consumption in response to the motion sensor 48 not detecting motion for a predetermined amount of time. A user can then simply tap or move the housing 18, which will cause the motion 48 to send a wake up signal to the controller 32. If desired, upon reception of the wake up signal, the controller 32 can cause the LED 44 to pulse to provide a visual indication that the device 10 is active. Further, if desired, the pulse can indicate a power source level, as described above.

The power source 38 can be a replaceable or rechargeable battery. In versions having a rechargeable battery 38, the electronic assembly 24 can include the port 50 to receive a plug to electrically couple the electronic assembly 24 to an external power supply to thereby recharge the power source 38. The port 50 can be configured to accept any suitable plug, such as micro-USB, USB, or others. If desired, the controller 32 can illuminate the LED 44 as the power source 38 is charging and provide a visual indication when the power source 38 is charged, such as changing from red to green, for example.

In one form, the tension sensing assembly 34 can include one or more Hall effect sensors 56 mounted to one of the base 20 or cover 22 and a magnet 58 coupled to the other of the base 20 or cover 22. So configured, the Hall effect sensor 56 will measure a varying magnetic field strength based on distance the sensor 56 is from the magnet 58. By being coupled to the movable portions of the housing 18, compression of the housing 18 will draw the sensor 56 and magnet 58 closer together to thereby indicate that the animal 12 is pulling on the lead 16. Taken a step further, the magnitude of the magnetic field strength can be directly correlated to an amount of force imparted to the lead 16 by the animal 12. In operation, the Hall effect sensor 56 provides a voltage to the controller 32 that is directly proportional to the magnitude of the magnetic field strength. The controller 32 can determine an analog value for the voltage to determine whether a predetermined threshold is exceed, as described in more detail below. In other forms, the tension sensor 34 can be any device configured to detect tension in the lead 16 or a force correlated to tension in the lead 16. For example, the tension sensor 34 can be a compression force sensor mounted between the base 20 and cover 22 or a tension force sensor coupled between the collar 14 and lead 16 or coupled in an intermediate portion or distal end of the lead 16.

As discussed above, the training device 10 can include one or more stimulus generating devices to generate a stimulus to thereby warn the animal 12 that it is undesirably pulling on the lead 16. Any combination of one or more stimuli may be utilized and, in versions having a plurality of stimuli, the stimuli may have different degrees of stimulation for the animal 12. For example, the stimuli may have increasing or escalating intensity, harshness, length, and so forth. Example illustrative stimuli described herein include sounds, vibration, and electric shock. So configured, the first stimulus generating device 36 can be a sound generating device configured to produce a tone, alarm, or other sound, which can be a piezoelectric sounder, a speaker, and so forth, the second stimulus generating device 40 can be a vibration generator or motor; and the third stimulus generating device 40 can be a shock assembly including a pair of electrodes 60 having distal ends 62 that are configured to engage the animal 12 to deliver an electric shock. The shock assembly 40 can be configured to generate a predetermined number of shocks to the animal 12 at a desired voltage. After the predetermined number of shocks have been generated, the controller 32 can be configured to deactivate the shock assembly 40.

In some versions, the training device 10 can include just the first stimulus generating device 36. Further, the first stimulus generating device 36 can be configured to generate a plurality of stimuli having different degrees of stimulation, e.g., different intensity and/or duration. For example, the device 36 can be configured to generate two different sounds, i.e., a longer sound and/or a louder sound, two different vibrations, or two different electric shocks, i.e., a longer duration and/or a larger voltage. In other versions, the training device 10 can include two of the stimulus generating devices 36, 40, 42 or all three of the stimulus generating devices 36, 40, 42.

The training devices 10, and the stimulus generating devices thereof, described herein can be tailor for particular animals and applications. For example, the stimulus provided to a small breed or animal may be relatively lower than the same type of stimulus provided to a large breed or animal. It will be understood that, where possible, a single component can be configured to generate more than one stimulus and thereby correspond to more than one of the stimulus generating devices described herein.

One example shock assembly 40 is shown in FIGS. 2 and 3. In the illustrated form, the electrodes 60 are coupled to the circuit board 54 via couplings 64 mounted to the circuit board 54. For example, the couplings 64 can have a threaded internal passage and proximal ends 66 of the electrodes 60 can be threaded to threadingly secure the electrodes 60 to the couplings 64 and to the circuit board 54. The couplings 64 can be welded to the circuit board 54 or secured thereto using fasteners 65, as shown. If desired, the transformer 52 can be utilized to condition electricity provided by the power source 38 to a desired voltage and/or current to the electrodes 60 when the open circuit formed by the shock assembly 40 is closed by the skin of the animal 12 and the controller 32 determines that a shock is necessary for behavior correction, as discussed in more detail below.

Details of the housing 18 are shown in FIGS. 2 and 4-7. In the illustrated form, the base 20 includes an outer wall 68 and sidewalls 70 extending inwardly from edges of the outer wall 68 to define a base interior 72. The base interior 72 can be sized to receive most of the electronic assembly 24 therein. Pursuant to this, the sidewalls 70 and/or outer wall 68 can include openings for access to components of the electronic assembly 24. For example, in versions having the following components, the sidewalls 70 or outer wall 68 can define a switch opening 74, a port opening 76, and an LED opening 78. Alternatively, a portion of the sidewalls 70 or outer wall 68 disposed over the LED 44 can be transparent or translucent so that a user can easily see when the LED 44 is energized. In the illustrated form, the circuit board 54 can have a perimeter that generally conforms to an inner surface 80 of the sidewalls 70 so that the circuit board 54 can be used as supporting structure for the various other components of the electronic assembly 24. Further, the base 20 can include an inwardly projecting lip or shoulder 82 extending around all or a portion of the interior 72 so that the circuit board 54 can rest on the lip 82 when installed within the base interior 72 to hold the circuit board 54 in a stable position within the base 20.

If desired, the outer wall 68 can have a concave curvature to generally match the curvature of the neck of the animal 12. Further, the sidewalls 70 can have a generally uniform height, such that an interior edge 84 of the sidewalls 70 opposite the outer wall 68 follow the curvature of the edge of the outer wall 68. As discussed above, the base 20 can include the handle 26 to removably couple the base 20 to the collar 14. As shown, the handle 26 can extend outwardly from the outer wall 68 in a generally central location with the opening thereof extending across a width of the outer wall 68. This configuration ensures that the collar 14 extends along the length of the outer wall 68 such that the collar 14 extends over a majority of the housing 18 when the collar 14 is worn by the animal 12.

Figure 5:
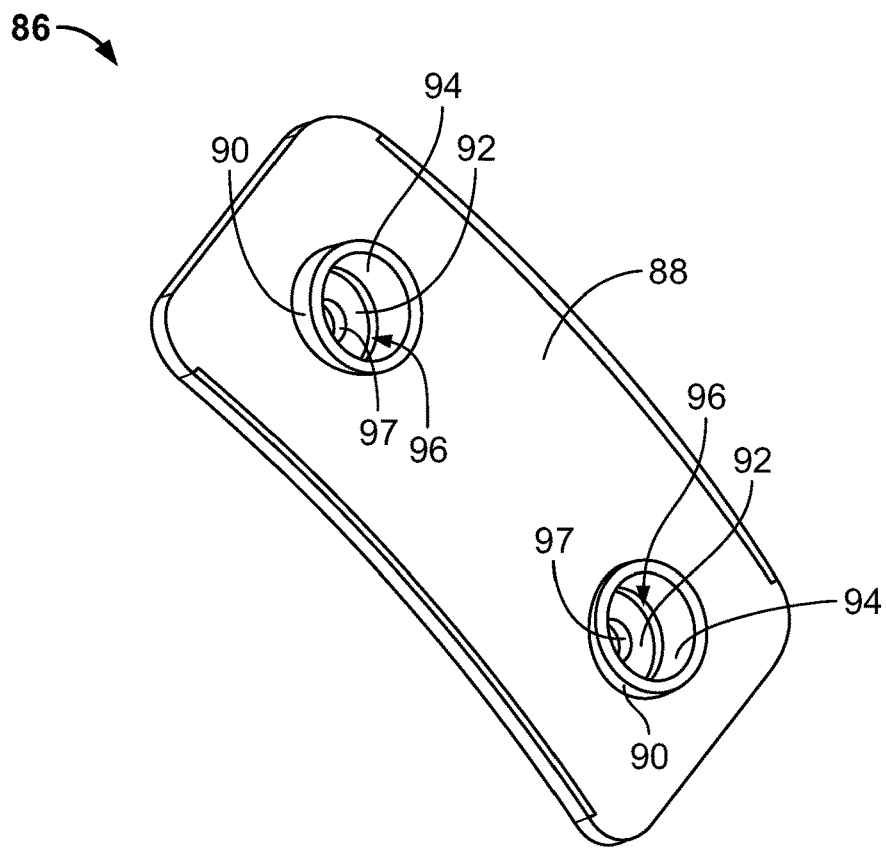
FIG. 5 is a perspective view of a lid for the base of the housing of FIG. 2.

As shown in FIGS. 2 and 5, the housing 18 can further include a base lid 86 that is configured to mount to the base 20 on or adjacent to the interior edge 84 of the sidewalls 70. The base lid 86 includes a wall 88 having a perimeter that generally conforms to the perimeter or the inner surface 80 of the sidewalls 70. The wall 88 includes two protrusions 90 extending outwardly from intermediate positions along the length thereof. The protrusions 90 can have a cylindrical configuration as shown with an end wall 92 and an annular sidewall 94 extending from the end wall 92 to a main portion of the wall 88. With this configuration, the protrusions 90 each define a cavity 96 that opens to the base interior 72 when the lid 86 is mounted to the base 20. In the illustrated form, the lip 82 of the base 20 can position the circuit board 54 closely adjacent to the interior edge 84 of the sidewalls 70, such that the couplings 64 of the shock assembly 40 extend out of the base interior 72. The lid 86 can then be mounted to the base 20 so that the couplings 64 extend into the cavities 96 of the lid protrusions 90. Further, the end walls 92 can have an opening 97 extending therethrough so that the electrodes 60 can be inserted through the openings 97 to secure to the couplings 64.

In one form, the base 20 can further include a second lip or shoulder 98 extending along all or a portion of the inner surface 80 of the sidewalls 70 adjacent to the interior edge 84 thereof, so that the lid 86 can rest on the lip 98 to couple the lid 86 to the base 20. The lid 86 can be secured to the base 20 using a suitable adhesive, fasteners, ultrasonic welding, and so forth. As shown, in some versions, the wall 88 and second lip 98 can have a curvature complementary to the curvature of the interior edge 84 of the sidewalls 70. In these forms, the sidewalls 94 of the protrusions 90 can include a portion extending outwardly from the interior surface of the lid 86 to provide planar surfaces for the protrusions 90 to abut the circuit board 54.

Figure 6:
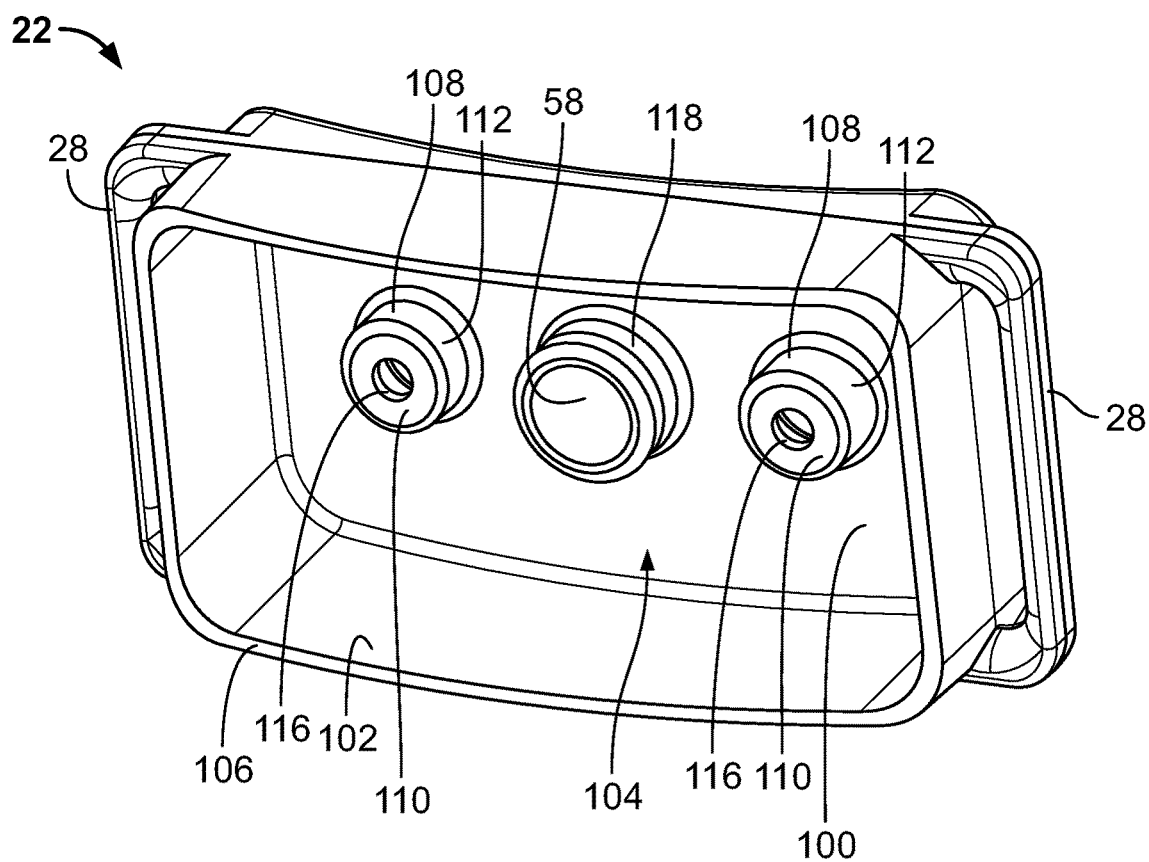
FIG. 6 is a perspective view of a cover of the housing of FIG. 2.

Details of the cover 22 are shown in FIGS. 2 and 6. In the illustrated form, the cover 22 includes an inner wall 100 of the housing 18 and sidewalls 102 extending inwardly from edges of the inner wall 100 to define a cover interior 104. The sidewalls 102 and cover interior 104 can be sized to telescopically receive the base 20 therein, such that the base sidewall 70 can slide into and out of the cover 22. If desired, the inner wall 100 can have a concave curvature to generally match the curvature of the neck of the animal 12. Further, the sidewalls 102 can have a generally uniform height, such that an exterior edge 106 of the sidewalls 102 opposite the inner wall 100 follow the curvature of the edge of the inner wall 100. As discussed above, the cover 22 can include the pair of laterally extending handles 28 to removably couple the cover 22 to the collar 14. As shown, the handles 28 can extend outwardly from the sidewalls 102 along the length of the cover 22. This configuration, combined with the base handle 26, ensures that the collar 14 extends along the length of the housing 18 when the collar 14 is worn by the animal 12, as well as holding the base 20 and cover 22 together.

As shown, the inner wall 100 of the cover 22 includes two protrusions 108 extending inwardly from intermediate positions along the length thereof. The protrusions 108 can each have a cylindrical configuration as shown with an end wall 110 and an annular sidewall 112 extending from the end wall 110 to a main portion of the inner wall 100. With this configuration, the protrusions 108 each define a cavity 114 that opens to an exterior of the cover 22 when the cover 22 is mounted to the base 20. In the illustrated form, the protrusions 108 of the cover 22 align with the protrusions 90 of the lid 86 when the cover 22 is coupled to the base 22. This configuration can be utilized to hold the biasing devices 30 in place within the housing 18. For example, the biasing devices 30 can have interior diameters sized to extend around the protrusions 90, 108 of the lid 86 and cover 22, such that the protrusions 90, 108 hold the biasing devices 30 in position relative to the housing components. Further, the end walls 110 can have an opening 116 extending therethrough so that the electrodes 60 can be inserted through the openings 116, 97 of both the protrusions 108, 90 to secure to the couplings 64.

As discussed above, the training device 10 includes one or more biasing devices 30 disposed between the base 20 and cover 22 to bias the housing 18 to an expanded state. Advantageously, the shock assembly 24 can be configured so that the distal ends 62 of the electrodes 60 are disposed within cavities 114 of the cover protrusions 108 when the housing 18 is in the expanded state. Thereafter, when the base 20 and cover 22 are moved toward one another due to tension in the lead 16, the distal ends 62 extend past the inner wall 100 to contact the skin of the animal 12 prior to the delivery of a shock. Although the cover 22 is described as including the protrusions 108, in an alternative form, the cover 22 could simply include openings so that the distal ends 62 of the electrodes 60 are disposed within the cover interior 104 with the housing 18 in the expanded state.

As discussed above, the tension sensing assembly 34 can include the Hall effect sensor 56 and the magnet 58. As shown in FIGS. 2 and 6, in one example configuration, the magnet 58 can be mounted to the cover 22 and the Hall effect sensor 56 can be mounted to the circuit board 54 so that the magnet 58 and the Hall effect sensor 56 are generally aligned when the cover 22 is coupled to the base 20. For example, the cover 22 can include an inwardly extending wall 118 sized to receive the magnet 58 therein. Alternatively, the magnet 58 can be secured to the inner wall 100.

Figure 7:
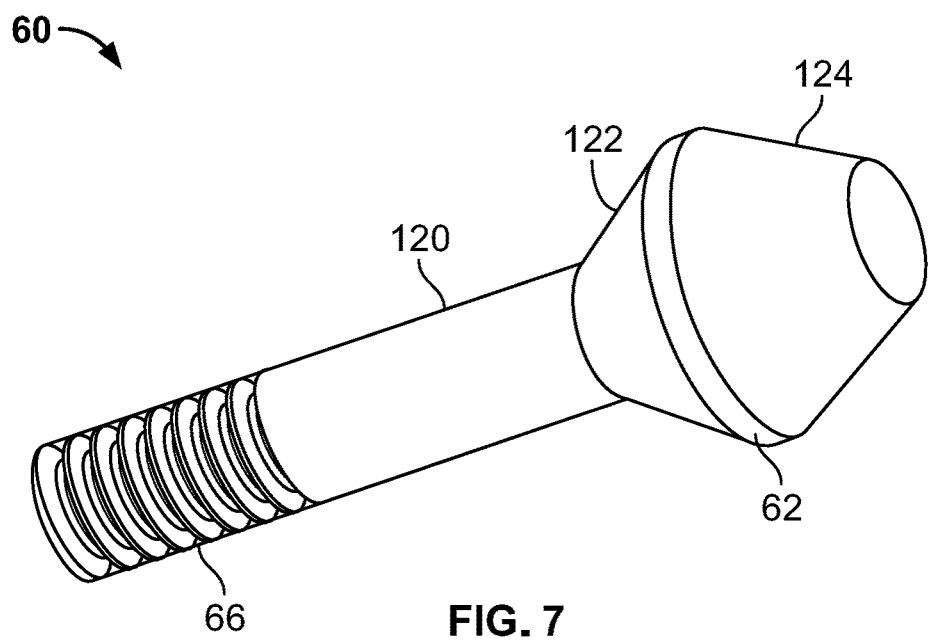
FIG. 7 is a perspective view of an electrode of the electronic assembly of FIG. 2.

An example configuration for the electrodes 60 is shown in FIG. 7. As shown, the electrode 60 of this form includes a cylindrical body 120 having an elongate configuration with the threaded proximal end 66 and the opposite, distal end 62 having a bulbous profile. In the illustrated form, the distal end 62 includes an outwardly tapering frusto-conical portion 122 and an inwardly tapering frusto-conical portion 124 that is distal to the outwardly tapering frusto-conical portion 122 so that the distal end 62 has an expanded radial width between the two frusto-conical portions 122, 124. Of course, other shapes and configurations, including curved shapes, an outwardly extending conical shape, rectangular shapes, etc., can be utilized. Advantageously, the expanded radial width of the distal end 62 can be larger than the opening 116 through the protrusion end wall 110, such that when the electrodes 60 are secured to the couplings 64 through the cover 22 and lid 86, as described above, the electrodes 60 secure the cover 22 to the base 20 by virtue of the end wall 110 abutting the outwardly tapering portions 122 of the electrodes 60.

Figure 8:
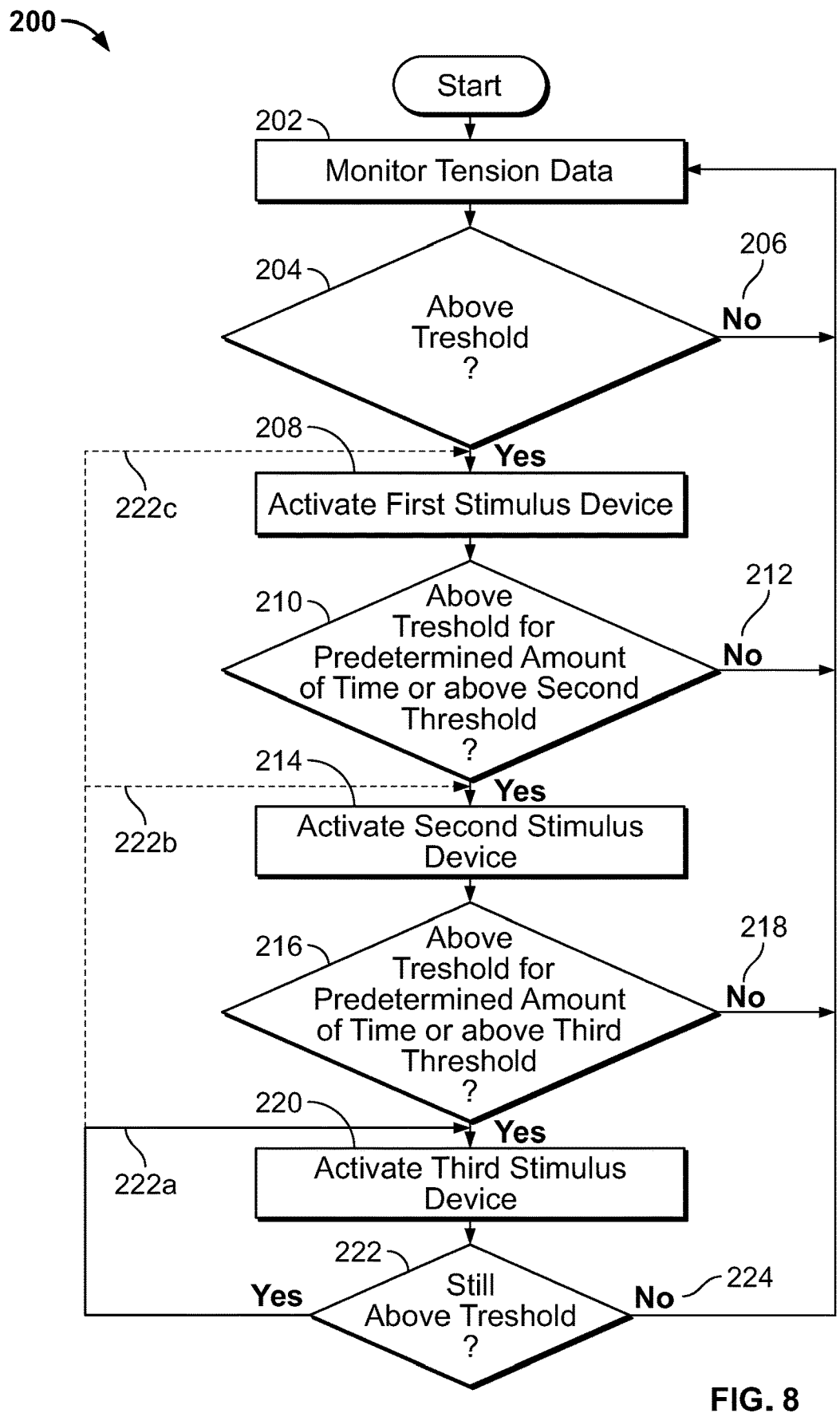
FIG. 8 is a flowchart for operating the training device of FIG. 1.

A method 200 of operating the training devices 10 described herein is shown in FIG. 8. In a first step 202, the controller 32 monitors data from the tension sensor 34. In versions with the Hall effect sensor 56 and magnet 58, this takes the form of monitoring data associated with magnetic field strength measurements from the Hall effect sensor 56. In a second step 204, the controller 32 determines if the data exceeds a first predetermined threshold. For example, the controller 32 can convert the data to an analog value and compare the analog value to a predetermined value. If the data is below the first predetermined threshold, in a third step 206, the method 200 returns to monitoring the tension data. If the data exceeds the first predetermined threshold, in a fourth step 208, the controller 32 activates the first stimulus generating device 36 to provide a first stimulus to the animal 12. Thereafter, the controller 32 continues to monitor the data from the tension sensor 34 and, in a fifth step 210, determine whether the data exceeds a second predetermined threshold and/or determine whether the data exceeds the first predetermined threshold for a predetermined amount of time. If the data is below the second predetermined threshold and/or does not exceed the first predetermined threshold for the predetermined amount of time, in a sixth step 212, the method 200 returns to monitoring the tension data. If the data exceeds the second predetermined threshold and/or exceeds the first predetermined threshold for the predetermined amount of time, in a seventh step 214, the controller 32 activates the second stimulus generating device 40 to provide a second stimulus to the animal 12. In one version, the activation of the second stimulus generating device 40 can be immediately performed upon the determination that the data exceeds the second predetermined threshold, such that if the animal 12 pulls hard on the lead 16, the controller 32 will sequentially activate the first and second stimulus generating devices 36, 40 one after another without a delay between them. For some purposes, differing first and second stimuli are sufficient. For example, as discussed above, the first and second stimuli can be any desired combination of sounds, vibration, and shock.

If desired, as shown in FIG. 8, the method 200 can further include a third stimuli. As such, in an eighth step 216, the controller 32 can determine whether the data exceeds a third predetermined threshold and/or determine whether the data exceeds the second predetermined threshold for a predetermined amount of time. If the data is below the third predetermined threshold and/or does not exceed the second predetermined threshold for the predetermined amount of time, in a ninth step 218, the method 200 returns to monitoring the tension data. If the data exceeds the third predetermined threshold and/or exceeds the second predetermined threshold for the predetermined amount of time, in a tenth step 220, the controller 32 activates the third stimulus generating device 42 to provide a third stimulus to the animal 12. In one version, the activation of the third stimulus generating device 42 can be immediately performed upon the determination that the data exceeds the third predetermined threshold, such that if the animal 12 pulls hard on the lead 16, the controller 32 will sequentially activate the first, second, and third stimulus generating devices 36, 40, 42 or the second and third stimulus generating device 40, 42, depending on current status, one after another without a delay between them In an optional eleventh step 222, the controller 32 can determine whether the data continues to exceed the third predetermined threshold and/or continues to exceed the second predetermined threshold after delivery of the third stimuli, the controller 32 can route the process back to activate one of the stimuli. For example, the eleventh step 222 can include a step 222*a* back to the tenth step 220 to reactivate the third stimulus generating device 42, a step 222*b* back to the seventh step 214 to reactivate the second stimulus generating device 40, or a step 222*c* back to the fourth step 208 to reactivate the first stimulus generating device 36. If the controller 32 determines that the data does not exceed the third predetermined threshold or does not still exceed the second predetermined threshold, in a twelfth step 222, the method 200 returns to monitoring the tension data.

In one example form, the first stimulus generating device 36 can be a tone generator such that the fourth step 208 results in a tone being emitted to stimulate the animal 12, the second stimulus generating device 40 can be a vibration motor, such that the seventh step 214 results in a vibration stimulus to the animal 12; and the third stimulus generating device 42 can be the shock assembly, such that the tenth step 220 results in a shock stimulus to the animal 12.

The term "lead" as used herein can refer to any configuration of leash or other tether used to control an animal. The lead can be made of any suitable material, including natural products, such as leather, plastics, metal chains or mesh, rope, etc. As such, the disclosure provided herein should not be considered to be limited to standard leashes. The term "collar" as used herein can include any combination of straps or harness extending around a portion of the animal to control the movement thereof. As such, the disclosure provided herein should not be considered to be limited to standard collars that only extend around a neck of the animal. Further, it will be understood that the scope of the present disclosure includes any animal suitable for control with a lead. This includes all domestic animals, as well as, animals at places of business or sanctuary, such as zoos, parks, farms, etc.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A training device mountable to a collar for training an animal on a lead coupled to the collar, the training device comprising:

a housing having first and second portions movable toward one another from an expanded state, the housing configured to be coupled to the collar so that the housing is disposed inwardly of at least a portion of the collar such that tension on the lead causes the first and second portions to move toward one another;

a biasing device configured to act on the first and second portions to bias the housing to the expanded state;

an electronic assembly at least partially disposed within the housing, the electronic assembly comprising:

a controller;

a power source;

first and second stimulus generating devices; and a lead tension measurement assembly comprising a Hall effect sensor coupled to one of the first and second portions and a magnet coupled to the other of the first and second portions, such that the controller is configured to:

monitor a magnetic field strength measured by the Hall effect sensor to determine an amount of movement of the first and second portions of the housing relative to one another;

activate the first stimulus generating device to generate a first stimulus in response to determining that the magnetic field strength exceeds a predetermined threshold; and activate the second stimulus generating device to generate a second stimulus in response to determining that the magnetic field strength is maintained above the predetermined threshold for a predetermined amount of time or the magnetic field strength exceeds a second predetermined threshold, the second predetermined threshold being higher than the first predetermined threshold.

2. The training device of claim 1, wherein the first stimulus generating device comprises: a tone generator or a vibration device; and the second stimulus generating device comprises a shock assembly including a pair of electrodes having distal ends that extend out of the housing to contact skin of the animal wearing the collar.

3. The training device of claim 1, wherein the electronic assembly further comprises a third stimulus generating device; and the controller is configured to activate the third stimulus generating device in response to determining that the magnetic field strength is maintained above the second predetermined threshold for a predetermined amount of time or the magnetic field strength exceeds a third predetermined threshold, the third predetermined threshold being higher than the second predetermined threshold.

4. The training device of claim 3, wherein the first stimulus generating device comprises a tone generator, the second stimulus generating device comprises a vibration device, and the third stimulus generating device comprises a shock assembly including a pair of electrodes having distal ends that extend out of the housing to contact skin of the animal wearing the collar.

5. The training device of claim 1, wherein the first and second portions of the housing comprise a base and cover telescopically coupled together.

6. The training device of claim 1, wherein an interior surface of the housing has a concave configuration to be complementary to a neck of the animal.

7. A training device mountable to a collar for training an animal on a lead coupled to the collar, the training device comprising:
    a housing having first and second portions movable toward one another from an expanded state, the housing configured to be coupled to the collar so that the housing is disposed inwardly of at least a portion of the collar with an interior wall of the housing facing the animal such that tension on the lead causes the first and second portions to move toward one another;
    a biasing device configured to act on the first and second portions to bias the housing to the expanded state;
    an electronic assembly at least partially disposed within the housing, the electronic assembly comprising:
        a tension sensor configured to measure data corresponding to a tension imparted to the collar by the lead;
        a power source;
        a first stimulus generating device;
        a second stimulus generating device comprising a shock assembly including a pair of electrodes each having a distal tip, the distal tips concealed within the housing with the housing in the expanded state and exposed as the first and second portions of the housing are moved towards one another; and
        a controller operably coupled to the tension sensor, such that the controller is configured to:
            activate the first stimulus generating device to generate a first stimulus in response to determining that the data exceeds a predetermined threshold; and
            activate the second stimulus generating device to generate a shock in response to determining that the data is maintained above the predetermined threshold for a predetermined amount of time or the data exceeds a second predetermined threshold, the second predetermined threshold being higher than the first predetermined threshold.

8. The training device of claim 7, wherein the interior wall of the housing defines a pair of recesses therein, the distal ends of the electrodes concealed within the recesses with the housing in the expanded state.

9. The training device of claim 7, wherein the electrodes each comprise an elongate body with a proximal end mounted within the housing and a bulbous distal end, the bulbous distal end including an outwardly tapering surface.

10. The training device of claim 7, wherein the first stimulus generating device comprises a tone generator or a vibration device.

11. The training device of claim 7, wherein the tension sensor comprises a Hall effect sensor coupled to one of the first and second portions and a magnet coupled to the other of the first and second portions, and the controller is configured to monitor a magnetic field strength measured by the Hall effect sensor to determine an amount of movement of the first and second portions of the housing relative to one another.

12. The training device of claim 7, wherein the electronic assembly further comprises a third stimulus generating device; and wherein the electronic assembly is configured to:
    activate the third stimulus generating device to generate a third stimulus in response to determining that the data is maintained above the predetermined threshold for a predetermined amount of time or the data exceeds a third predetermined threshold, the third predetermined threshold being intermediate of the first predetermined threshold and the second predetermined threshold; and
    activate the second stimulus generating device to generate the shock in response to determining that the data is maintained above the third predetermined threshold for a predetermined amount of time or the data exceeds the second predetermined threshold, the second predetermined threshold being higher than the first and third predetermined thresholds.

13. The training device of claim 7, wherein the first and second portions of the housing comprise a base and cover telescopically coupled together.

14. The training device of claim 7, wherein the interior wall of the housing has a concave configuration to be complementary to a neck of the animal.

15. A method for training an animal on a lead with a training device mounted to a collar, the method comprising:
    biasing first and second portions of a housing to an expanded state, the first and second portions being movable toward one another from the expanded state;
    monitoring a magnetic field strength of a magnet coupled to one of the first and second portions of the housing measured by a Hall effect sensor coupled to the other of the first and second portions of the housing with a controller to determine an amount of movement of the first and second portions of the housing relative to one another;
    activating a first stimulus generating device with the controller to generate a first stimulus in response to determining that the magnetic field strength exceeds a predetermined threshold; and
    activating a second stimulus generating device with the controller to generate a second stimulus in response to determining that the magnetic field strength is maintained above the predetermined threshold for a predetermined amount of time or the magnetic field strength exceeds a second predetermined threshold, the second predetermined threshold being higher than the first predetermined threshold.

16. The method of claim 15, wherein activating the first stimulus generating device with the controller to generate the first stimulus comprises activating a tone generator to generate a tone or activating a vibration device to vibrate the housing; and activating the second stimulus generating device with the controller to generate the second stimulus comprises activating a shock assembly including a pair of electrodes having distal ends that extend out of the housing to contact skin of the animal wearing the collar to generate a shock to the animal.

17. The method of claim 16, further comprising exposing the distal ends of the electrodes from concealment within the housing as the first and second portions of the housing are moved towards one another prior to activating the shock assembly.

18. The method of claim 17, wherein exposing the distal ends of the electrodes form concealment within the housing comprises exposing the distal ends of the electrodes from concealment within a pair of recesses defined by an interior wall of the housing.

19. The method of claim 15, further comprising activating a third stimulus generating device with the controller in response to determining that the magnetic field strength is maintained above the second predetermined threshold for a predetermined amount of time or the magnetic field strength exceeds a third predetermined threshold, the third predetermined threshold being higher than the second predetermined threshold.

20. The method of claim 19, wherein activating the first stimulus generating device with the controller to generate the first stimulus comprises activating a tone generator to generate a tone; activating the second stimulus generating device with the controller to generate a second stimulus comprises activating a vibration device to vibrate the housing; and activating the third stimulus generating device with the controller to generate the third stimulus comprises activating a shock assembly including a pair of electrodes having distal ends that extend out of the housing to contact skin of the animal wearing the collar to generate a shock to the animal.

\* \* \* \* \*